United States Patent
Rasmussen et al.

(10) Patent No.: US 10,310,157 B2
(45) Date of Patent: Jun. 4, 2019

(54) MULTI-PIECE LIGHT GUIDE FOR ENHANCED ALIGNMENT THROUGH AN OPAQUE SURFACE

(71) Applicant: Apple Inc., Cupertino, CA (US)

(72) Inventors: Timothy J. Rasmussen, Sunnyvale, CA (US); Ian P. Colahan, Mountain View, CA (US); Darshan R. Kasar, San Francisco, CA (US); Tian Shi Li, Kitchener (CA)

(73) Assignee: APPLE INC., Cupertino, CA (US)

( * ) Notice: Subject to any disclaimer, the term of this patent is extended or adjusted under 35 U.S.C. 154(b) by 260 days.

(21) Appl. No.: 15/268,200

(22) Filed: Sep. 16, 2016

(65) Prior Publication Data

US 2017/0160455 A1  Jun. 8, 2017

Related U.S. Application Data

(60) Provisional application No. 62/263,536, filed on Dec. 4, 2015.

(51) Int. Cl.
| | |
|---|---|
| *F21V 8/00* | (2006.01) |
| *H01M 10/44* | (2006.01) |
| *H01M 10/48* | (2006.01) |
| *H02J 7/00* | (2006.01) |
| *H04B 1/3888* | (2015.01) |

(52) U.S. Cl.
CPC .......... *G02B 6/0008* (2013.01); *H02J 7/0047* (2013.01); *H04B 1/3888* (2013.01); *H01M 10/488* (2013.01); *H02J 2007/005* (2013.01)

(58) Field of Classification Search
CPC . G01D 7/005; F21Y 2113/10; F21Y 2113/13; F21V 7/0091; F21V 7/043; F21V 7/046; F21L 4/027; H02J 7/0047
See application file for complete search history.

(56) References Cited

U.S. PATENT DOCUMENTS

| | | | |
|---|---|---|---|
| 6,561,659 B1 * | 5/2003 | Hsu .......................... | H04M 1/22 349/65 |
| 6,743,993 B1 * | 6/2004 | Clark .................... | H01H 13/702 200/314 |

(Continued)

FOREIGN PATENT DOCUMENTS

EP        2362250 A1    8/2011

*Primary Examiner* — Jong-Suk (James) Lee
*Assistant Examiner* — Eric T Eide
(74) *Attorney, Agent, or Firm* — Dorsey & Whitney LLP

(57) ABSTRACT

An accessory device is disclosed. The accessory device may include a light guide assembly that directs light from a light source (or sources) through an opening of the accessory device, and in particular, in a base portion of the accessory device. The light guide assembly may be disposed in a compartment of the accessory device and include a light guide body as well as a light guide insert disposed in an opening of the light guide body. To form the opening, a single cutting operation may cut through the base portion and the light guide body so that the respective openings of the base portion and the light guide body are aligned. The light guide body may be designed to receive the light from the light source and direct or focus the light toward the light guide insert. The light guide insert may refract, scatter, and/or diffuse the light.

20 Claims, 10 Drawing Sheets

(56) References Cited

U.S. PATENT DOCUMENTS

| | | | |
|---|---|---|---|
| 7,230,195 B2* | 6/2007 | Ohnishi | H01H 9/18 |
| | | | 200/302.1 |
| 7,293,904 B2 | 11/2007 | Beitelspacher | |
| 9,082,256 B2 | 7/2015 | Griswold et al. | |
| 9,313,305 B1* | 4/2016 | Diebel | G03B 17/02 |
| 2004/0239831 A1 | 12/2004 | Palumbo et al. | |
| 2011/0044046 A1 | 2/2011 | Abu-Ageel | |
| 2011/0299134 A1* | 12/2011 | Shimoyama | H03K 17/962 |
| | | | 358/474 |
| 2013/0027973 A1* | 1/2013 | Huang | G02B 6/0008 |
| | | | 362/609 |
| 2014/0071691 A1* | 3/2014 | Ito | A61B 1/0661 |
| | | | 362/308 |
| 2014/0268629 A1* | 9/2014 | Krishnaswamy | G02B 6/006 |
| | | | 362/23.1 |
| 2014/0321098 A1* | 10/2014 | Andre | G09F 9/30 |
| | | | 362/23.03 |
| 2015/0085469 A1* | 3/2015 | Kamee | A61B 1/0653 |
| | | | 362/84 |
| 2015/0260905 A1* | 9/2015 | Yuan | G02B 6/0076 |
| | | | 362/612 |
| 2018/0000205 A1* | 1/2018 | Chinowsky | F21V 33/0008 |

* cited by examiner

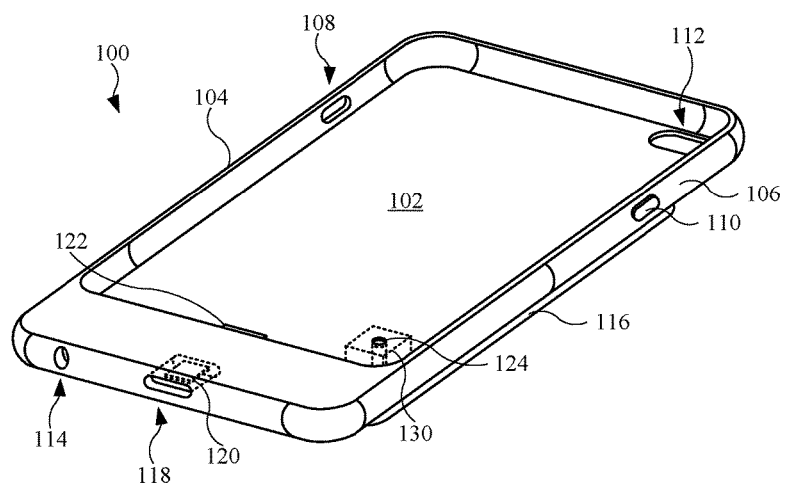
FIG. 1
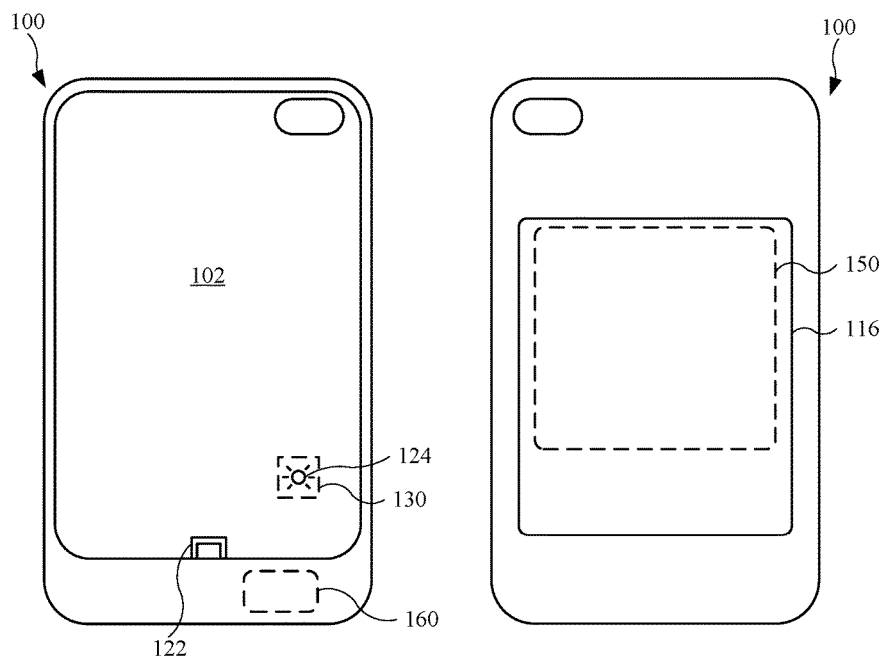
FIG. 2
FIG. 3

MULTI-PIECE LIGHT GUIDE FOR ENHANCED ALIGNMENT THROUGH AN OPAQUE SURFACE

CROSS-REFERENCE TO RELATED APPLICATIONS

This application claims the benefit of priority under 35 U.S.C. § 119(e) to U.S. Provisional Application No. 62/263,536, filed on Dec. 4, 2015, entitled "MULTI-PIECE LIGHT GUIDE FOR ENHANCED ALIGNMENT THROUGH AN OPAQUE SURFACE," the disclosure of which is incorporated herein by reference in its entirety.

FIELD

The following description relates to a light guide assembly in an accessory device. In particular, the following description relates to a multi-piece light guide assembly that directs light from a light guide to a light insert. The light insert can scatter or diffuse the light uniformly across a surface of the light insert. Also, methods for aligning the light insert with an opening of the accessory device include a single cutting operation through the accessory device and the light guide body.

BACKGROUND

Accessory devices can be used to provide a protective cover for electronic devices. Some accessory devices include a layer (or layers) of material having a pre-cut opening in the layer(s), with the pre-cut opening aligned with an object disposed in the accessory device. However, several issues can arise with pre-cut openings. For example, the object must be properly aligned with the pre-cut opening. One solution is to laser cut the opening to expose the object. However, the layer(s) may include a fabric layer that is sensitive to laser cutting and may burn or char while forming the opening.

SUMMARY

In one aspect, a light guide assembly for directing light is described. The light guide assembly may include an opaque layer that includes a through hole. The light guide assembly may further include a light guide body overlaid by the opaque layer, and may further include a light receiving surface arranged to receive light. The light guide body may further include a cavity that partially extends into the light guide body. The cavity may be aligned with the through hole. The light guide assembly may further include a light guide insert carried by the light guide body within the cavity arranged to pass light from the light guide body through the through hole.

In another aspect, an accessory device suitable for carrying an object is described. The accessory device may include an opaque layer that includes an opening. The accessory device may further include a light source that emits light. The accessory may further include a light guide assembly. The light guide assembly may further include a light guide body having a light receiving surface that receives the light from the light source. The light guide body may include a cavity aligned with the opening. The light guide assembly may further include a light guide insert positioned in the cavity. The light guide insert may include a light emission surface. In some embodiments, the light guide insert is configured to receive the light from the light guide body and diffuse the light across the light emission surface causing the light to pass through the opening.

In another aspect, a method for assembling a light guide assembly in an accessory device having an opaque layer is described. The method may include identifying a location of a light guide body hidden by the opaque layer. The light guide body may be positioned between the opaque layer and a light source. The method may further include, after identifying the light guide body, performing a single cutting operation that forms a first opening in the opaque layer and a cavity in the light guide body such that the cavity is concentric with the first opening. The method may further include inserting a light guide insert in the cavity. The light guide insert may be optically coupled with the light guide body and may also include a light emission surface. In some embodiments, the light guide insert is configured to receive the light from the light guide body and pass the light across the light emission surface.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 1 illustrates an isometric view of an embodiment of an accessory device, in accordance with some described embodiments;

FIG. 2 illustrates an front plan view of the accessory device shown in FIG. 1;

FIG. 3 illustrates a rear plan view of the accessory device shown in FIG. 1;

Figure 4:
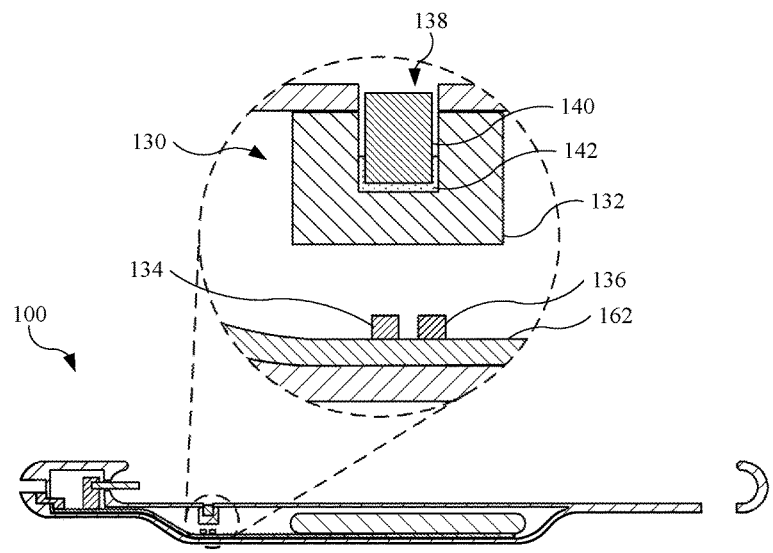
FIG. 4 illustrates a cross sectional view of the accessory device shown in FIG. 2, showing several internal components disposed in the accessory device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with some described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an accessory device having a light guide assembly designed to direct light in a desired manner. For example, the light guide assembly may direct light from a light source, such as a light-emitting diode ("LED"), through an opening of the accessory device. In some cases, the light guide assembly and the LED are disposed in a compartment of the accessory device, with the compartment carrying additional components such as a flexible circuit assembly and/or an internal power supply. In some instances, the light source is used as an indication of a battery charge level of the internal power supply.

Some accessory devices may include a single-piece light guide disposed below one or more opaque layers of the accessory device. The opaque layer(s) may include a pre-cut opening or aperture designed to allow light received by the single-piece light guide to exit through the opaque layer(s) via the pre-cut opening. However, in the present disclosure, an accessory device may include a multi-piece light guide assembly positioned in a compartment and disposed below an opaque layer(s). The light guide assembly may include a light guide body and a light guide insert, or light pipe, disposed in an opening of the light guide body. In order to form an opening in both the opaque layer and the light guide body, a cutting tool, such as a computer-numeric control ("CNC") cutting tool, may form both openings in a single operation. Other tools, such as electric drills are possible. Further, in a single operation, the cutting tool may cut the opening in the opaque layer(s) as well as cut the opening in the light guide body to that receives the light guide insert. Moreover, the cutting tool may form a through hole passing completely through the layer(s), while forming a partial opening, or blind hole, that partially extends into the light guide body. In this manner, the opening of the opaque layer(s) is aligned, and also concentric, with the opening of the light guide body. Further, the light guide insert, when positioned in the opening of the light guide body, may also be aligned, and also, concentric with the opening of the opaque layer(s). Based on this alignment, the opaque layer(s) does not block the light passing through the light guide insert.

The light guide assembly may include several components formed from an optically conductive material, or materials. For example, the light guide body may include a clear polymeric material that allows light to pass through the light body. In this regard, the light guide body may include a light receiving surface. In some cases, the light guide body is designed to direct light to a focal point. Further, when the focal point is located within the light guide body, the light received at the focal point may be directed or reflected to another location of the light guide body. For instance, the light guide insert, an additional clear polymer body positioned in the blind hole of the light guide body, may receive the light directed from the light guide body, and in some cases, from the focal point of the light guide body. The light guide insert may refract, scatter, and/or or diffuse the light throughout an internal region of the light guide insert, causing the light to exit across an exterior surface of the light guide pipe, with the exterior surface aligned with the opening in the layer(s). Further, the scattering of the light through the light guide insert may cause all, or substantially all, of the exterior surface to illuminate and enhance the appearance of the light at the exterior surface.

Referring again to the light source, in some cases, the accessory device includes multiple light sources, such as a first light source and a second light source, designed to present light in different colors, which may correspond to different indications. For instance, when the accessory device includes an internal power supply (such as a battery), the accessory device receives electrical current (from an external power source) to charge the internal power supply, which in turn is used to charge a battery in an electronic device positioned in the electronic device. In order to determine a charge state of the internal power supply, the first light source may illuminate to present a first color of light, corresponding to a first charging state. For example, first color may indicate the internal power supply is in a charging configuration and is receiving electrical current to increase the charge level of the internal power supply. Once the internal power supply is fully charged, the first light source may deactivate and the second light source may illuminate to present a second color of light different from the first color, corresponding to a second charging state. The second color may indicate the internal power supply is fully charged, and the external power source can be removed from the accessory device.

These and other embodiments are discussed below with reference to FIGS. 1-20. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with some described embodiments. The accessory device 100 may be designed to receive, and provide protection for, an electronic device (not shown), which may include, as non-limiting examples, a mobile communication device (such as a smartphone), a tablet computing device, or the like. As shown, the accessory device 100 may include a base portion 102 designed in part to receive an electronic device. The base portion 102 may define part of a receptacle that receives the electronic device. The base portion 102 may be formed from one or more layers of material. Further, the base portion 102 may be formed from one or more opaque layers of material that prevent light passage through the base portion 102. The layers may include, as non-limiting examples, silicone, fabric (such as microfiber), and/or plastic (such as polycarbonate).

Further, the accessory device 100 may include several sidewalls, including a first sidewall 104 and a second sidewall 106. The sidewalls may combine with the base portion 102 to receive and protect an electronic device, while also allowing a user to interact with the electronic device. For example, as shown in FIG. 1, the first sidewall 104 may include an opening 108, or through hole, formed in the first sidewall 104. The opening 108 may be positioned in a location corresponding to a button or switch of an electronic device, thereby allowing a user to actuate the button or switch when the electronic device is disposed in the accessory device 100. Also, as shown in FIG. 1, the second sidewall 106 may include a protruding feature 110, which may be positioned in a location corresponding to an additional button of an electronic device, thereby allowing a user to actuate the button (when the electronic device is disposed in the accessory device 100) by depressing the protruding feature 110. Although the opening 108 and the protruding feature 110 are shown in discrete locations, the opening 108 and the protruding feature 110 may be located in different locations of their respective sidewalls. Also, in some embodiments (not shown), the first sidewall 104 may include a protruding feature, similar to the protruding feature 110, and the second sidewall 106 may include an opening, similar to the opening 108. Further, in other embodiments, the accessory device 100 may include two or more openings and/or protruding features.

The accessory device 100 may include additional features to accommodate an electronic device. For example, the base portion 102 of the accessory device 100 may include an opening 112, which may be positioned in a location corresponding to an image capture device, such as a camera, disposed in the electronic device. Also, the accessory device 100 may include an opening 114 positioned in a location corresponding to an audio jack of an electronic device, thereby allowing, for example, a plug of a headset to extend through the opening 114 to electrically and mechanically couple with an electronic device when the electronic device is disposed in the accessory device 100.

In addition to providing a protective cover for an electronic device, the accessory device 100 may provide additional functionality. For example, as shown in FIG. 1, the accessory device 100 may include a compartment 116 defined in part by the base portion 102. The compartment 116 may be used as a housing to contain several features, such as a light guide assembly 130. The compartment 116 may carry additional components, such as a flexible circuit (or circuit assembly) and an internal power supply. The circuit assembly and the internal power supply will be shown and described below. Also, the accessory device 100 may include an opening 118 that opens to a port 120 designed to receive a connector of a cable assembly (not shown). The port 120 may include one or more electrically conductive pins (not shown) designed to electrically couple with the connector. The cable assembly (not shown) may supply electrical current to the accessory device 100 in order to charge the internal power supply of the accessory device 100. When the aforementioned connector is inserted into the opening 118, the cable assembly, when connected to a power source (not shown), may supply electrical current to the internal power supply by way of the flexible circuit. Further, the accessory device 100 may include a connector 122 designed to electrically couple with an electronic device when the electronic device is disposed in the accessory device 100. In this regard, the internal power supply of the accessory device 100 may provide electrical current to a battery (not shown) in an electronic device by way of the connector 122 and a flexible circuit (not shown) electrically coupled with the connector 122 and the internal power supply.

Also, the base portion 102 may include an opening 124 that allows a light guide assembly 130 to deliver light from one or more light sources (not shown). Both the light guide assembly 130 and the light source(s) may be disposed in the compartment 116 and at least partially hidden by the base portion 102. The light guide assembly 130 may be used to provide an indication of a charging state of the internal power supply of the accessory device 100. For example, the light guide assembly 130 may display the light in different colors, with the color corresponding to the charging state of the internal power supply. For example, the light guide assembly 130 may display light of a first color (using a first light source) while the internal power supply is charging, and the light guide assembly 130 may display light of a second color (using a second light source) while the internal power supply is fully charged. Accordingly, the second color may be different or distinguishable from the first color. The opening 124 and the light guide assembly 130, and the formation thereof, will be shown and described in detail below.

FIG. 2 illustrates a front plan view of the accessory device 100 shown in FIG. 1. As shown, the opening 124 allows the light directed from the light guide assembly 130 to pass through the base portion 102. Also, the connector 122 may extend from the accessory device 100 to receive and electrically couple with an electronic device (not shown) when the electronic device is positioned in the accessory device 100. The circuit board 160 may be coupled with the port 120 (shown in FIG. 1). The connector 122 may be in electrical communication with a circuit board 160 hidden by one or more layers of material of the accessory device 100. The circuit board 160 may include a processor circuit (not shown) that monitors electrical current passing through the connector 122. In addition to the processor circuit, the circuit board 160 may further include a memory circuit (not shown) that stores one or more programs used by the processor circuit to monitor the charge level and provide a control or command to illuminate at least one of the aforementioned light sources based upon the charge level of an internal power supply of the accessory device 100.

FIG. 3 illustrates a rear plan view of the accessory device 100 shown in FIG. 1. As shown, the compartment 116 includes an internal power supply 150 (shown as dotted lines) designed to supply electrical current to a battery of an electronic device (not shown). The internal power supply 150 may include a battery cell designed to store energy in order to supply electrical energy. The internal power supply 150 may be in electrical communication with the port 120 (shown in FIG. 1) and the circuit board 160 (shown in FIG. 2) by way of a circuit assembly (shown later) embedded between one or more layers of the accessory device 100. The internal power supply 150 may receive electrical current by the electrical connection with the port 120 (shown in FIG. 2), and may also be monitored by a processor circuit the circuit board 160 (shown in FIG. 2).

FIG. 4 illustrates a cross sectional view of the accessory device 100 shown in FIG. 2, showing several internal components disposed in the accessory device 100. As shown in the enlarged view, the light guide assembly 130 may include a light guide body 132 designed to receive light from light sources, such as a first light source 134 and a second light source 136, electrically coupled with a circuit assembly 162. The circuit assembly 162 may provide an electrical pathway for the first light source 134 and the second light source 136 to receive electrical current to illuminate. The light guide body 132 may include a light receiving surface that receives the light from the first light source 134 and the second light source 136. The light guide body 132 may also include an opening 138 that receives a light guide insert 140. The opening 138 may be referred to a cavity or a blind hole that extends partially, but not completely, through the light guide body 132.

The light guide insert 140 may be referred to as a light guide insert designed to receive light from the light guide body 132. In this regard, both the light guide body 132 and the light guide insert 140 may be formed from optically conductive materials, such as plastic, resin, or a glass material. However, the light guide body 132 may be designed to focus the light, while the light guide insert 140 may be designed to refract, scatter, and/or diffuse the light received by the light guide body 132. In other words, the light guide body 132 may include a material (or materials) having a first refractive index or first diffusivity of light, and the light guide insert 140 may include a material (or materials) having a different material make up than that of the light guide body 132 such that the light guide insert 140 includes a second refractive index or second diffusivity of light, different from the first refractive index or second diffusivity of light, respectively, of the light guide body 132. Also, the light guide insert 140 may be secured with the light guide body 132 by an adhesive 142. In some embodiments, the adhesive 142 includes an optically clear material that allows light to pass through the adhesive 142.

Figure 5:
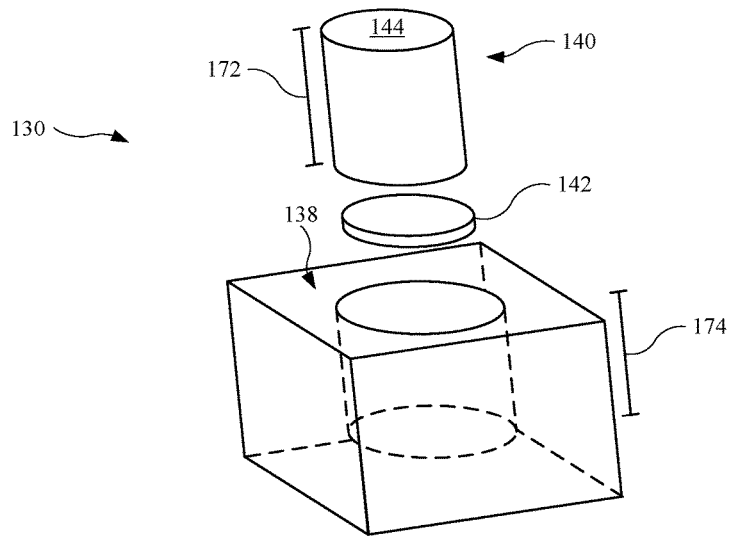
FIG. 5 illustrates an exploded view of the light guide assembly.

FIG. 5 illustrates an exploded view of the light guide assembly 130, in accordance with some described embodiments. As shown, the opening 138 of the light guide body 132 may be designed to receive the light guide insert 140 as well as the adhesive 142. The light guide insert 140 may include an exterior surface 144 through which light may pass from the light guide body 132 and through the light guide insert 140. In this regard, the exterior surface 144 may be referred to as a light emission surface. In some embodiments, the light guide insert 140 may refract, scatter, and/or diffuse the light received from the light guide body 132 such that the light is dispersed across the exterior surface 144. Further, the exterior surface 144 may be modified to create additional illumination effects. For example, the exterior surface 144 may be textured or roughened to further scatter the light passing through the exterior surface 144. Alternatively, or in combination, the exterior surface 144 may include a clear coating (of paint, for example) that provides a light reflecting feature. Further, the curved (cylindrical) surface of the light guide insert 140 may receive an optically reflective coating of paint such that when light within the light guide insert 140 reaches the curved surface, the optically reflective coating reflects the light in a direction away from the curved surface. Generally, the optically reflective coating may be positioned in any location other than the exterior surface 144 and a light receiving surface (not shown) of the light guide insert 140 that is opposite the exterior surface 144. Alternatively, or in combination, the light guide insert 140 may include an optically absorbing layer (that may include paint) designed to absorb light. The optically absorbing layer may further control light passing through the light guide insert 140, and may also be disposed on the light guide insert 140 in any location described for a location for the optically reflective paint. Also, the opening 138 may include a shape corresponding to the shape of the light guide insert 140, and in particular, the shape of the exterior surface 144. For example, as shown, the light guide insert 140 is generally cylindrical, and accordingly, the opening 138 is also cylindrical. However, in other embodiments, the light guide insert 140 may include a three-dimensional feature with one surface having three or more sides. In this regard, the opening 138 may include a corresponding number of sides.

Also, the light guide insert 140 may be designed to partially protrude from the light guide body 132. For example, the light guide insert 140 may include a dimension 172 greater than a dimension 174 of the opening 138. The light guide insert 140 may partially protrude from the light guide body 132 due in part to a thickness of the adhesive 142. However, in other embodiments, the light guide insert 140, and in particular, the exterior surface 144, may be flush or co-planar with respect to a surface of the light guide body 132 such that the light guide insert 140 does not protrude (externally) from the light guide body 132.

Figure 6:
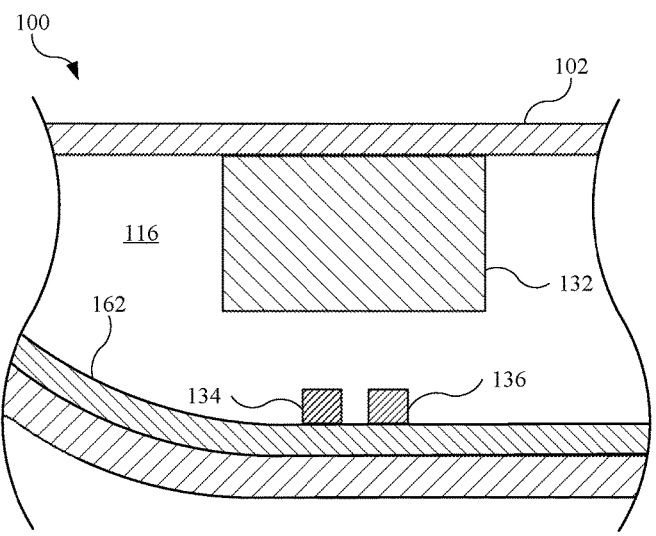
FIG. 6 illustrates an enlarged cross sectional view of the accessory device, showing a light guide positioned between the base portion and a pair of light sources.

FIGS. 6-12 show and describe a process for forming an accessory device having a light guide assembly, in accordance with some described embodiments. FIG. 6 illustrates an enlarged cross sectional view of the accessory device 100, showing a light guide body 132 positioned within the compartment 116 between the base portion 102 and the light sources. Although a single layer represents the base portion 102 in FIG. 6, the base portion 102 may represent several layers, such as a fabric layer (including microfiber), a plastic layer (including polycarbonate), and/or a plate, as non-limiting examples. Also, as shown, the first light source 134 and the second light source 136 are electrically coupled with the circuit assembly 162 to receive electrical current from the internal power supply 150 (shown in FIG. 2), and also to receive a control or command to illuminate based upon a charge state of the internal power supply 150 (shown in FIG. 3). Further, the light guide body 132 may be positioned relative to the first light source 134 and the second light source 136 such that the light guide body 132 may receive light from the first light source 134 and the second light source 136. Also, in some embodiments, the light guide body 132 is secured with the base portion 102.

Figure 7:
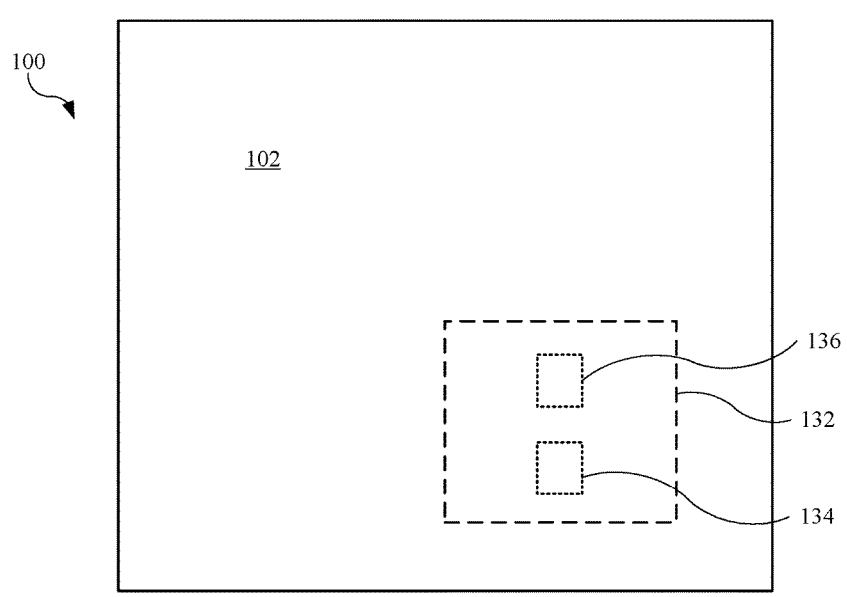
FIG. 7 illustrates a partial plan view of the accessory device shown in FIG. 6, showing the base portion covering the light guide body, the first light source, and the second light source.

FIG. 7 illustrates a partial plan view of the accessory device 100 shown in FIG. 6, showing the base portion 102 covering the light guide body 132, the first light source 134, and the second light source 136. In other words, the base portion 102 may hide the light guide body 132, the first light source 134, and the second light source 136. Prior to a cutting operation of the base portion 102, the location of the light guide body 132 may be identified. In some embodiments, the light guide body 132 is positioned in the compartment 116 (shown in FIG. 3) in accordance with a predetermined tolerance. Alternatively, or in conjunction, the sub-assembly of the accessory device 100 undergoes a scanning operation, which may include an X-ray scan or scan using sensors (such as a capacitive sensors). In either event, the location of the light guide body 132, disposed behind the base portion 102, is determined such that the cutting operation to the base portion 102 may also result in a cutting operation to the light guide body 132, and in particular, within in the edges of the light guide body 132.

Figure 8:
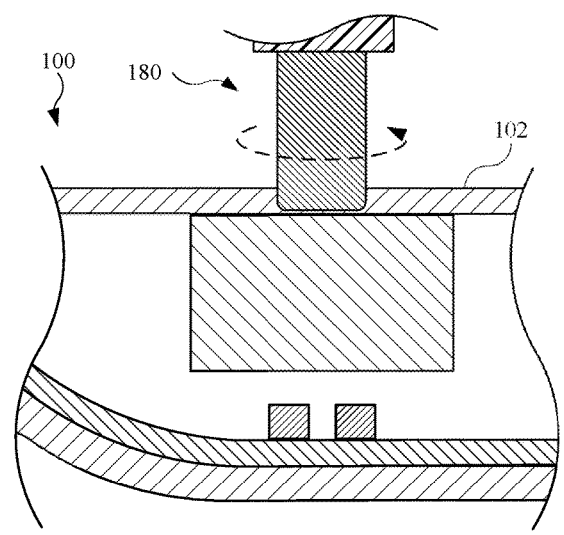
FIG. 8 illustrates the enlarged cross sectional view of the accessory device shown in FIG. 6, further showing a cutting tool cutting the base portion.

FIG. 8 illustrates the enlarged cross sectional view of the accessory device 100 shown in FIG. 6, further showing a cutting tool 180 cutting the base portion 102. In some embodiments, the cutting tool 180 is a CNC cutting tool capable of relatively high rotational speeds, such as 100,000 revolutions per minute ("RPM") or more. In this regard, when the base portion 102 includes a fabric layer, such as microfiber, the cutting tool 180 offers an "clean" finish that does not leave any partially hanging fibers, as compared to other cutting operations such as laser cutting that may burn or char the fabric layer. Although not shown, the cutting tool 180 may include a drill capable of a similar rotational speeds.

Figure 9:
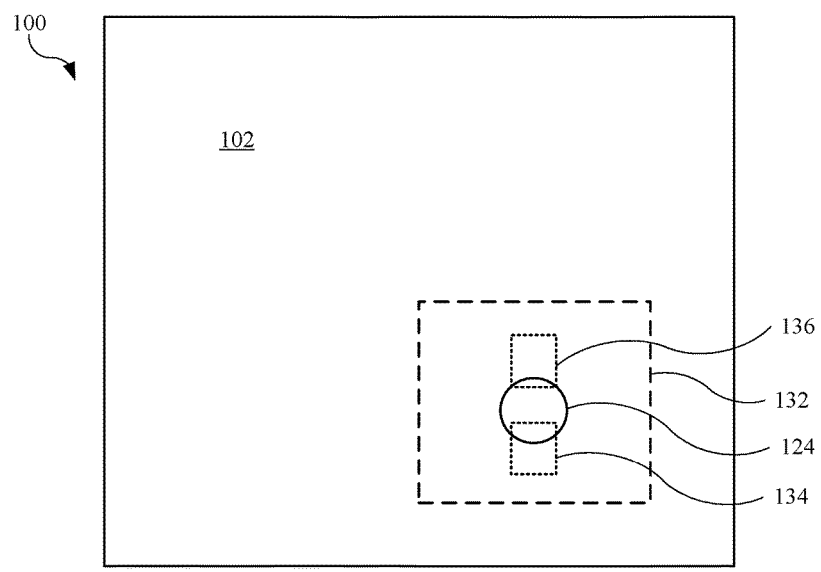
FIG. 9 illustrates a partial plan view of the accessory device shown in FIG. 8, showing the opening formed in the base portion.

FIG. 9 illustrates a partial plan view of the accessory device 100 shown in FIG. 8, showing the opening 124 formed in the base portion 102 by the cutting tool 180 (shown in FIG. 8). Generally, the opening 124 includes a circular shape. However, in other embodiments, the opening 124 includes a three-sided shape, such as a triangle. Further, other embodiments of the opening 124 may include a shape having four or more sides, based upon a shape cut by the cutting tool 180 (shown in FIG. 8). Also, the opening 124 may include a size and a shape corresponding to a size and a shape of a light guide insert (not shown) to be inserted into an opening of the light guide body 132. This will be shown and described below.

Also, as shown in FIG. 9, the opening 124 in the base portion 102 is in a location generally corresponding to a central portion of the light guide body 132 such that a continuous cutting operation to the base portion 102 and the light guide body 132 results in an opening in the central portion of the light guide body 132. However, in other embodiments, the opening 124 of the base portion 102 is in a location "off-center" with respect to the light guide body 132. For example, the opening 124 of the base portion 102 may be located in any one of the corner regions of the light guide body 132 so long as the cutting operation remains within an outer perimeter (denoted by a dotted line) of the light guide body 132. This ensures that a single cutting operation that cuts both the base portion 102 and the light guide body 132, thereby providing openings of the same diameter.

Figure 10:
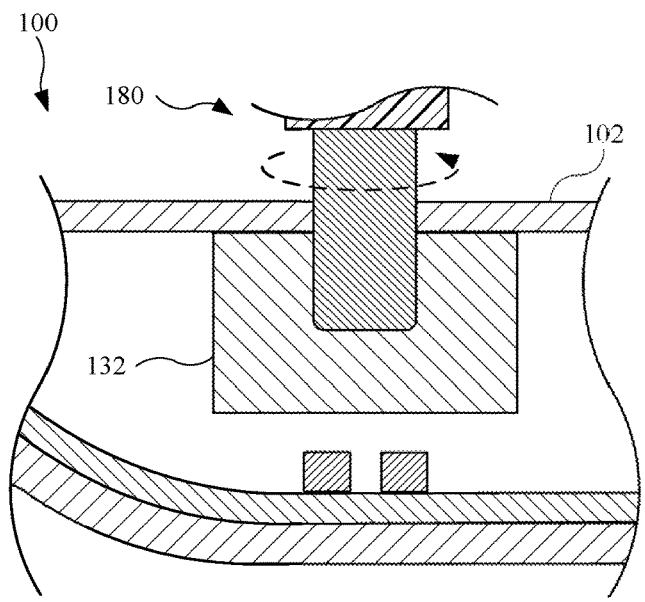
FIG. 10 illustrates the enlarged cross sectional view of the accessory device shown in FIG. 8, further showing the cutting tool extending through the base portion to cut an opening in the light guide body.

FIG. 10 illustrates the enlarged cross sectional view of the accessory device 100 shown in FIG. 8, further showing the cutting tool 180 extending through the base portion 102 to cut an opening in the light guide body 132. Accordingly, once the cutting tool 180 cuts through the base portion 102 to form an opening, the cutting tool 180 may continue, in a single cutting operation, cutting through the light guide body 132. The single cutting operation provides not only an efficient cutting step but also ensures an opening of the base portion 102 is aligned and concentric with an opening of the light guide body 132.

Figure 11:
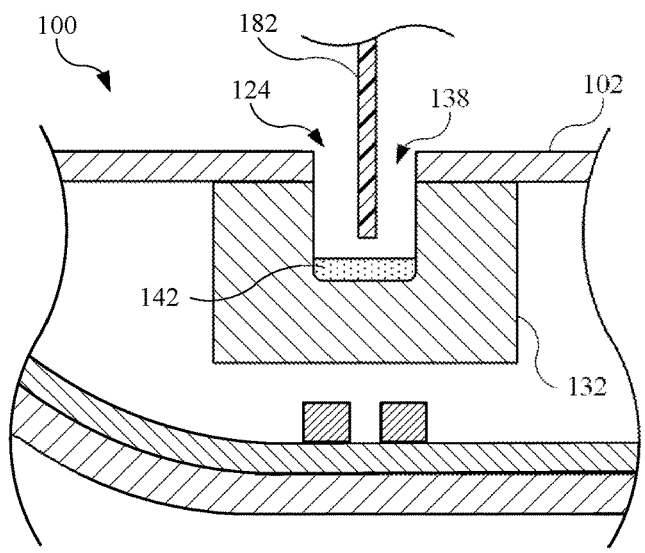
FIG. 11 illustrates an enlarged cross sectional of the accessory device view shown in FIG. 10, subsequent to the cutting operation that forms the opening of the base portion and the opening of the light guide body.

FIG. 11 illustrates an enlarged cross sectional view of the accessory device 100 shown in FIG. 10, subsequent to the cutting operation that forms the opening 124 of the base portion 102 and the opening 138 of the light guide body 132. As a result of the single cutting operation, the opening 124 of the base portion 102 is aligned and concentric with the opening 138 of the light guide body 132, and eliminates the need to align the opening 138 of the light guide body 132 with a pre-cut opening of the base portion 102. Prior to inserting a component in the opening 138, an adhesive 142 is applied to the opening 138. As shown, a dispensing tool 182 may be used to dispense the adhesive 142. The dispensing tool 182 may include a needle having a diameter small enough to extend through the opening 124 of the base portion 102 and the opening 138 of the light guide body 132. Also, the adhesive 142 may be dispensed in the opening 138 in a controlled manner such that when a light guide insert (not shown) is positioned in the opening 138, the adhesive 142 does not flow out of the opening 138. Although not shown, a vision system including a camera may be used to determine the location of the opening 124 in order to assist in guiding the dispensing tool 182 through the opening 124.

Figure 12:
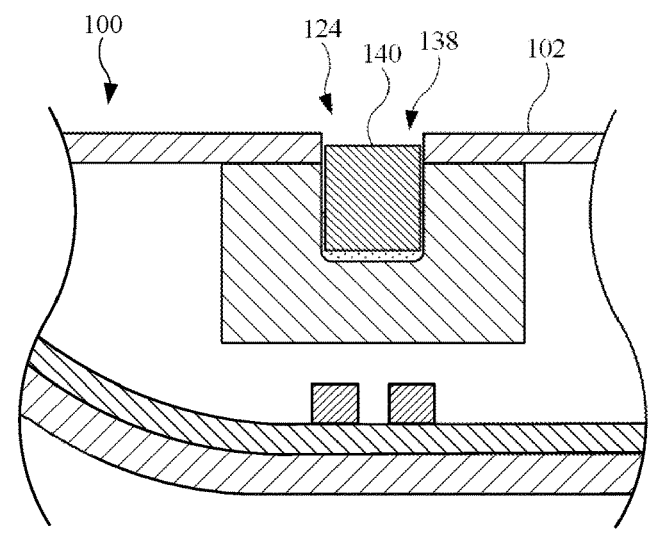
FIG. 12 illustrates the enlarged cross sectional view of the accessory device shown in FIG. 11, further showing the light guide insert positioned in the opening of the light guide.

FIG. 12 illustrates the enlarged cross sectional view of the accessory device 100 shown in FIG. 11, further showing the light guide insert 140 positioned in the opening 138 of the light guide body 132. As shown, a portion of the light guide insert 140 may extend beyond the light guide body 132 and into the opening 124 of the base portion 102. However, in some embodiments (not shown), the light guide insert 140 is positioned in the light guide body 132 such that the light guide insert 140 is sub-flush, or below, the base portion 102. This may prevent the light guide insert 140 from contacting an electronic device (not shown) when the electronic device is positioned in the accessory device 100. Also, the light guide insert 140 may be positioned in the opening 138 by a vision system (previously described) such that an automated assembly feature, such as a robotic arm, can place the light guide insert 140 in the opening 138.

The process shown in FIGS. 6-12 offers several advantages over traditional processes. For example, rather than attempting to position the light guide body 132 relative to a pre-cut opening, the light guide body 132 may be placed in the compartment 116 in a general location. Then, once the location of the light guide body 132 is determined, the opening 124 is formed relative to the location of the light guide body 132. This allows for a more controlled operation that requires less precision. Also, because the opening 124 of the base portion 102 and the opening 138 of the light guide body 132 are formed during a single cutting operation, the opening 138 is aligned and concentric with the opening 124 of the base portion 102. This requires less precision and time as compared to aligning a pre-cut opening of a light guide with a pre-cut opening of a base portion.

Figure 13:
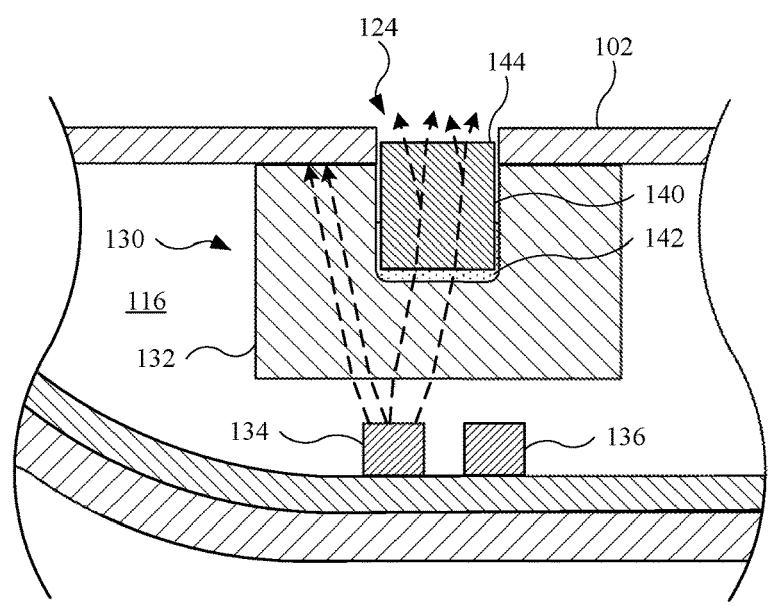
FIG. 13 illustrates an enlarged cross sectional view of the accessory device, showing light guide assembly receiving light from the first light source.

FIG. 13 illustrates an enlarged cross sectional view of the accessory device 100, showing light guide assembly 130 receiving light from the first light source 134. Light rays extending from the first light source 134 are represented by dotted lines. Light extending from the first light source 134 and/or the second light source 136 may refract, or bend, when passing from air to a different medium according to Snell's Law, given by:

$$n_1 \sin \theta_1 = n_2 \sin \theta_2$$

where $n_1$ is the refractive index of a first medium (such as air), $n_2$ is the refractive index of a second medium (such as the light guide body 132), $\theta_1$ is the angle of incidence between the light ray passing through the first medium and a normal with respect to the first medium, and $\theta_2$ is the angle of incidence between the light ray passing through the second medium and a normal with respect to the second medium. It should be noted that when, for example, a light ray passes from the light guide body 132 to the light guide insert 140, the "first medium" and associated angle is associated with the light guide body 132, and the "second medium" and associated angle is associated with the light guide insert 140. Also, for purposes of simplicity and approximation, the adhesive 142 and its refractive index are negligible.

The light guide body 132 may receive the light from the first light source 134 and direct the light toward the light guide insert 140. Accordingly, the light guide insert 140 may be optically coupled with the light guide body 132. The adhesive 142 may be an optically clear adhesive, and accordingly, may offer little if any reduction of light passage. When the light reaches the light guide insert 140, the light guide insert 140 may refract, scatter, and/or diffuse the light may split into multiple light rays, as shown in FIG. 13. This allows the light to be visible across the exterior surface 144 of the light guide insert 140 regardless of where the light enters the light guide insert 140. Also, although not shown, the light guide assembly 130 may receive light from the second light source 136 and direct a light in a manner similar to that of the first light source 134.

Further, as shown in FIG. 13, some light rays received by the light guide body 132 do not pass through the light guide insert 140. Rather, the light rays are refracted by the light guide body 132 and directed to the base portion 102, where the light rays are absorbed. In this manner, the light guide assembly 130, in conjunction with the base portion 102, controls an amount of light that passes through the opening 124 of the base portion 102. In other words, only light rays that are visible are those passing from the light guide body 132 to the light guide insert 140, which are then allowed to pass through the opening 124 of the base portion 102.

Also, although not shown, the base portion 102 may include two or more openings, each of which is similar to the opening 124, with each opening aligned with a light guide insert (similar to the light guide insert 140) of a light guide assembly (similar to the light guide assembly 130). The process for forming the openings and light guide assemblies may be repeated in a manner previously described. This may allow for additional light, and accordingly, different indications based upon the additional light.

As shown in FIG. 12, the light guide body 132 may include a first refractive index and the light guide insert 140 may include a second refractive index. This may allow for to light to refract, or bend, at different angles based on the medium (such as the light guide body 132 or the light guide insert 140). However, in some embodiments (not shown), the light guide body 132 and the light guide insert 140 may include the same or substantially similar refractive index, causing the light to refract, or bend, through the light guide body 132 and the light guide insert 140 at the same or substantially similar angles.

Figure 14:
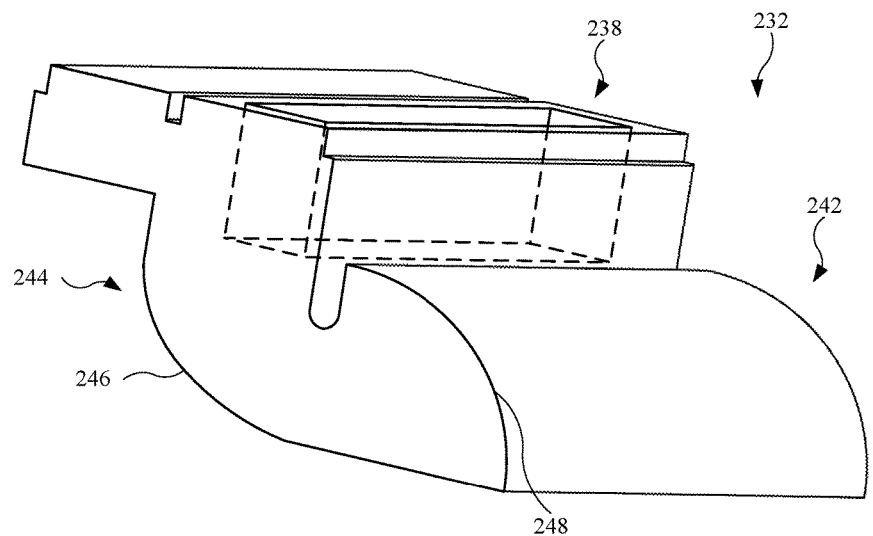
FIG. 14 illustrates an isometric view of an alternate embodiment of a light guide, in accordance with some described embodiments.

FIG. 14 illustrates an isometric view of an alternate embodiment of a light guide body 232, in accordance with some described embodiments. The light guide body 232 may be formed from any optically conductive material previously described for a light guide body. As shown, the light guide body 232 may include an opening 238 designed to receive a light guide insert (not shown). While the opening 238 shown in FIG. 14 is generally a three-dimensional feature having a rectangular shape, the opening 238 may include a cylindrical shape, as shown and described in previous embodiments. Also, a light guide insert may take on a shape corresponding to that of the opening 238. The light guide body 232 may be designed to direct light to various locations. For example, the light guide body 232 may include a first portion 242 designed to receive light from a light source (or sources), and a second portion 244 designed to direct the light received from the first portion 242 to the opening 238. As shown, the second portion 244 may be offset with respect to the first portion 242. In some embodiments, the first portion 242 includes a shape or configuration that defines a focal point 246 in the second portion 244. For example, as shown in FIG. 14, the first portion 242 includes a curved region 248 that causes the light received at the curved region 248 to travel to the focal point 246. Then, the light directed to the focal point 246 may be directed toward the opening 238.

Figure 15:
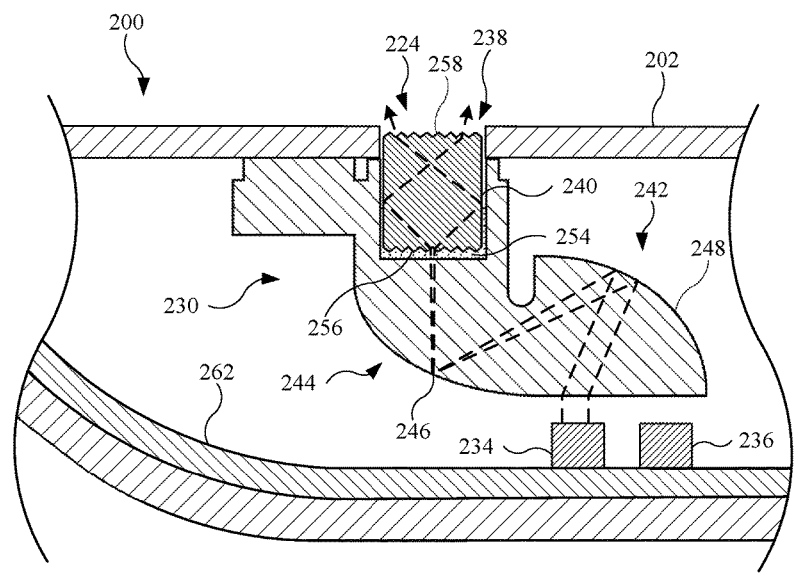
FIG. 15 illustrates an enlarged cross sectional view of an alternate embodiment of an accessory device that includes the light guide shown in FIG. 14, showing the light guide positioned between a base portion of the accessory device and a pair of light sources.

FIG. 15 illustrates an enlarged cross sectional view of an alternate embodiment of an accessory device 200 that includes the light guide body 232 shown in FIG. 14, showing the light guide body 232 positioned between a base portion 202 of the accessory device 200 and a pair of light sources. The accessory device 200 may include any feature, or features, previously described for an accessory device. In some embodiments, the light guide body 232 is adhesively secured with the base portion 202 by an adhesive (not shown). As shown, the light guide body 232 includes a light guide insert 240 disposed in the opening 238 of the light guide body 232, with the light guide insert 240 adhesively secured with the light guide body 232 by an adhesive 254, which may include an optically clear adhesive. The light guide body 232 and the light guide insert 240 may combine to define a light guide assembly 230 for directing light provided by a first light source 234 and/or a second light source 236, both of which may be electrically coupled with a circuit assembly 262.

As shown in FIG. 15, light (represented by dotted lines) emitted by the first light source 234 may enter the first portion 242 of the light guide body 232. The light may be directed to the curved region 248 of the first portion. Then, the light may be reflected from the curved region 248, causing the light to travel toward the focal point 246 located in the second portion 244 of the light guide body 232. The light may be directed from the focal point 246 to the light guide insert 240. The light guide insert 240 may include any feature or features previously described for an insert. Also, the light guide insert 240 may include a first textured surface 256 and a second textured surface 258. As shown, the second textured surface 258 is a surface opposite the first textured surface 256. The first textured surface 256 and/or the second textured surface 258 may represent a "saw tooth" configuration across a two-dimensional surface. However, other surface textures (such as a roughened, sandpapered, or sandblasted surface) may be used. The first textured surface 256 and/or the second textured surface 258 may cause light rays to scatter or disperse, and spread the light throughout the light guide insert 240, as shown in FIG. 15. Accordingly, the light guide insert 240 may be designed to scatter or disperse the light that passes through the light guide insert 240 in order to more evenly distribute the light through the light guide insert 240. While an exemplary light path for the first light source 234 is shown, a similar light path may be initiated by the second light source 236.

Also, a process for forming the light guide assembly 230 may be similar to a process previously described. For example, the light guide body 232 may be disposed between a base portion 202 of the accessory device 200 and the light sources. Then, in a single cutting operation, a cutting tool, such as a CNC cutting tool (previously described), may cut through the base portion 202 to form an opening 224 in the base portion 202, and also cut through the light guide body 232 to form the opening 238 in the light guide body 232. In this manner, the opening 224 of the base portion 202 may be aligned and concentric with the opening 238 of the light guide body 232.

Figure 16:
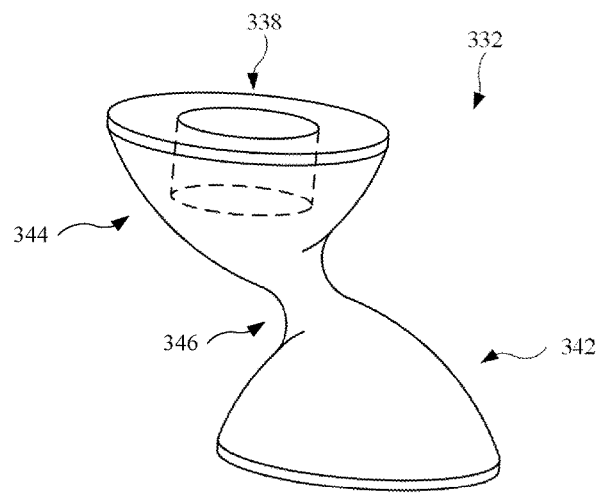
FIG. 16 illustrates an isometric view of an alternate embodiment of a light guide body, in accordance with some described embodiments.

FIG. 16 illustrates an isometric view of an alternate embodiment of a light guide body 332, in accordance with some described embodiments. The light guide body 332 may be formed from any optically conductive material previously described for a light guide body. As shown, the light guide body 332 may include an opening 338 designed to receive a light guide insert (not shown). While the opening 338 shown in FIG. 16 is generally cylindrical, the opening 338 may include a three-dimensional feature having a surface with three or more sides, and a light guide insert may take on a shape corresponding to that of the opening 238.

As shown, the light guide body 332 includes an "hourglass" configuration having a first portion 342 and a second portion 344 offset with respect to the first portion 342. Similar to previous embodiments, the light guide body 332 shown in FIG. 16 may be designed to direct light to various locations. For example, the first portion 342 may be designed to receive light from a light source (or sources), and the second portion 344 may be designed to direct the light received from the first portion 342 to the opening 338. Further, in some embodiments, the first portion 242 includes a shape or configuration designed to direct the light in a direction toward a central portion 346 that connects the first portion 342 with the second portion 344. In this regard, the light received at the first portion 342 may be directed toward the second portion 344 by a path defined by the central portion 346. Then, the light at the second portion 344 may be directed toward the opening 338.

Figure 17:
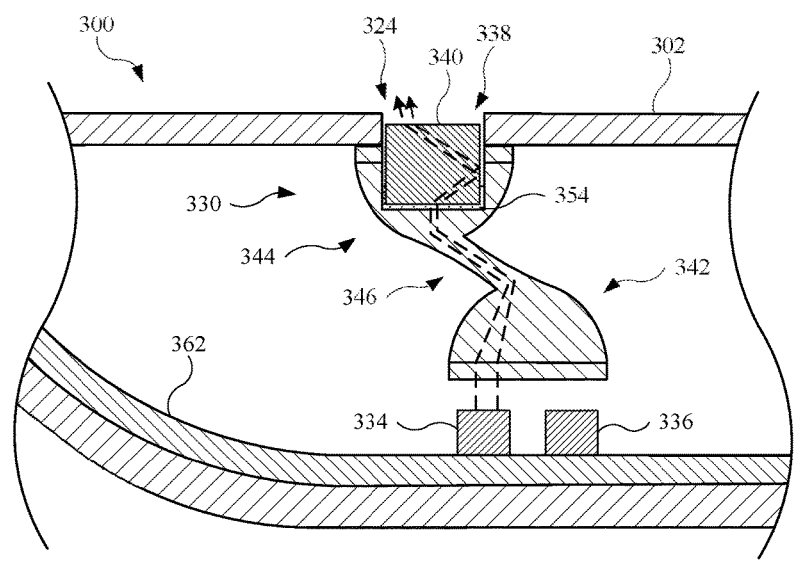
FIG. 17 illustrates an enlarged cross sectional view of an alternate embodiment of an accessory device that includes the light guide body shown in FIG. 16, showing the light guide body positioned between a base portion of the accessory device and a pair of light sources.

FIG. 17 illustrates an enlarged cross sectional view of an alternate embodiment of an accessory device 300 that includes the light guide body 332 shown in FIG. 16, showing the light guide body 332 positioned between a base portion 302 of the accessory device 300 and a pair of light sources. The accessory device 300 may include any feature, or features, previously described for an accessory device. As shown, the light guide body 332 includes a light guide insert 340 disposed in the opening 338 of the light guide body 332, with the light guide insert 340 adhesively secured with the light guide body 332 by an adhesive 354, which may include an optically clear adhesive. The light guide body 332 and the light guide insert 340 may combine to define a light guide assembly 330 for directing light from a first light source 334 and/or a second light source 336, both of which may be electrically coupled with a circuit assembly 362. As shown in FIG. 17, light (represented by dotted lines) emitted by the first light source 334 may enter the first portion 342 of the light guide body 332. The first portion 342 may be designed to direct the light to the second portion 344 by way of the central portion 346. Then, the light may be directed from the second portion 344 to the light guide insert 340. The light guide insert 340 may include any feature or features previously described for an insert. Accordingly, the light guide insert 340 may be designed to refract, scatter, and/or diffuse the light, causing the light to pass through any portion of an exterior surface of the light guide insert 340 in a manner previously described for an exterior surface of light guide insert. While an exemplary light path for the first light source 334 is shown, a similar light path may be initiated by the second light source 336.

Also, a process for forming the light guide assembly 330 may be similar to a process previously described. For example, the light guide body 332 may be disposed between a base portion 302 of the accessory device 300 and the light sources. Then, in a single cutting operation, a cutting tool, such as a CNC cutting tool (previously described), may cut through the base portion 302 to form an opening 324 in the base portion 302, and also cut through the light guide body 332 to form the opening 338 in the light guide body 332. In this manner, the opening 324 of the base portion 302 may be aligned and concentric with the opening 338 of the light guide body 332.

Figure 18:
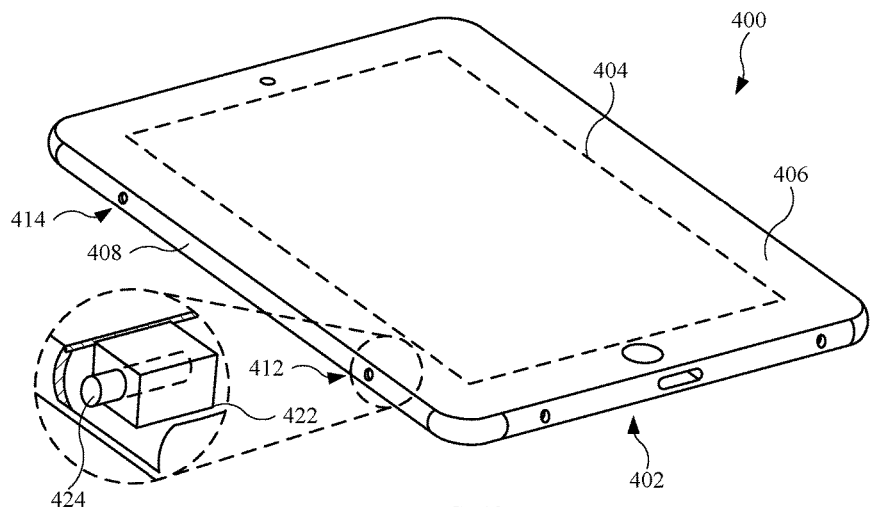
FIG. 18 illustrates an isometric view of an embodiment of an electronic device, in accordance with some described embodiments.

While the prior embodiments show and describe a cutting operation used to form a light guide assembly, the cutting operation may be used to form other features of an electronic device. For example, FIG. 18 illustrates an isometric view of an embodiment of an electronic device 400, in accordance with some described embodiments. In some embodiments, the electronic device 400 includes a mobile communication device, such as a smartphone commonly known in the art. In the embodiment shown in FIG. 18, the electronic device 400 is a tablet computing device. As shown, the electronic device 400 may include an enclosure 402 formed from a metal, such as aluminum or stainless steel. The electronic device 400 may further include a display assembly 404 (shown as a dotted line) designed to present visual information in the form of still images and/or video images. Also, a protective layer 406 may overlay the display assembly 404. The protective layer 406 may be formed from a transparent material, such as glass or sapphire.

Figure 19:
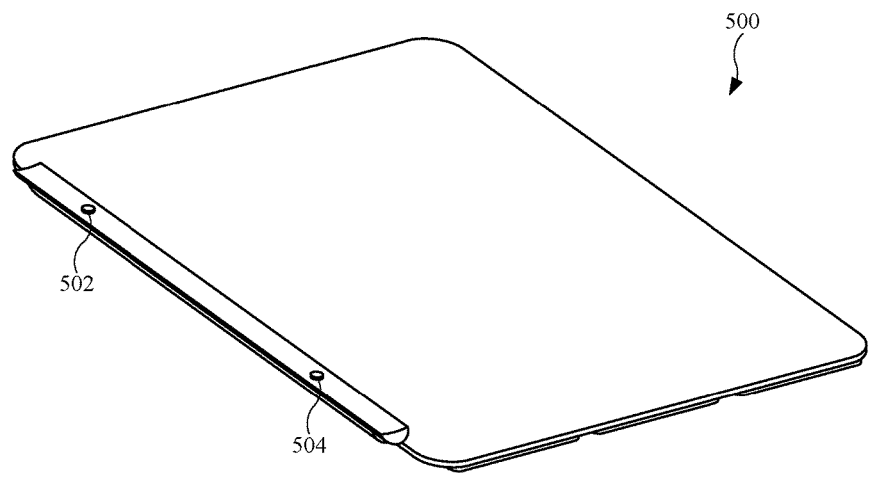
FIG. 19 illustrates an isometric view of embodiment of a cover designed for use with the electronic device shown in FIG. 18.

FIG. 19 illustrates an isometric view of embodiment of a cover 500 designed for use with the electronic device 400 shown in FIG. 18. The cover 500 may include a size and a shape to overlay the protective layer 406 (shown in FIG. 18). In order to secure the cover 500 to the electronic device 400, the cover may include a first protruding feature 502 and a second protruding feature 504. In some embodiments, the first protruding feature 502 and the second protruding feature 504 are magnets. In other embodiments, the first protruding feature 502 and the second protruding feature 504 include a magnetically attractable metal, such as soft steel. The first protruding feature 502 and the second protruding feature 504 may allow the cover 500 to magnetically couple with the electronic device 400. This will be further described below.

Referring again to FIG. 18, the enclosure 402 may include several sidewalls surrounding the display assembly 404. For example, the enclosure 402 may include a first sidewall 408. As shown, the first sidewall 408 may include a first opening 412 and a second opening 414. FIG. 18 further shows an enlarged partial cross sectional view with a portion of the protective layer 406 and a portion of the first sidewall 408 removed. As shown in the enlarged view, the electronic device 400 may include a block 422 having an insert 424 positioned in the block 422. In order to position the insert 424 in the block 422, both the first sidewall 408 and the block 422 may undergo a cutting operation by, for example, a CNC cutting tool. Further, in some embodiments, a single cutting operation forms the first opening 412 in the first sidewall 408 and an opening in the block 422 to receive the insert 424. In other words, the first opening 412 is not a pre-cut opening, but an opening that is formed subsequent to the positioning of the block 422 within the electronic device 400. In this manner, the first opening 412 may be aligned and concentric with the opening of the block 422. Also, the insert 424, when secured in the opening of the block 422 (by magnetic or adhesive means), may be proximate to the first opening 412.

The insert 424 may include a magnet or a magnetically attractable metal, depending upon the material makeup of the first protruding feature 502 (shown in FIG. 19). Generally, the insert 424 may include any material that forms a magnetic coupling with the first protruding feature 502. It will be appreciated that the second opening 414 of the first sidewall 408 may be formed in a manner similar to that of the first opening 412. Further, an insert and a block (not shown) may be positioned proximate to the second opening 414 in a manner similar to that of the block 422 and the insert 424 with respect to the first opening 412, and may also receive a single cutting operation. In this manner, the first protruding feature 502 and the second protruding feature 504 of the cover 500 may magnetically couple with the insert 424 and an insert proximate to the second opening 414, respectively, and the cover 500 may couple with the electronic device 400 by magnetic circuits.

Figure 20:
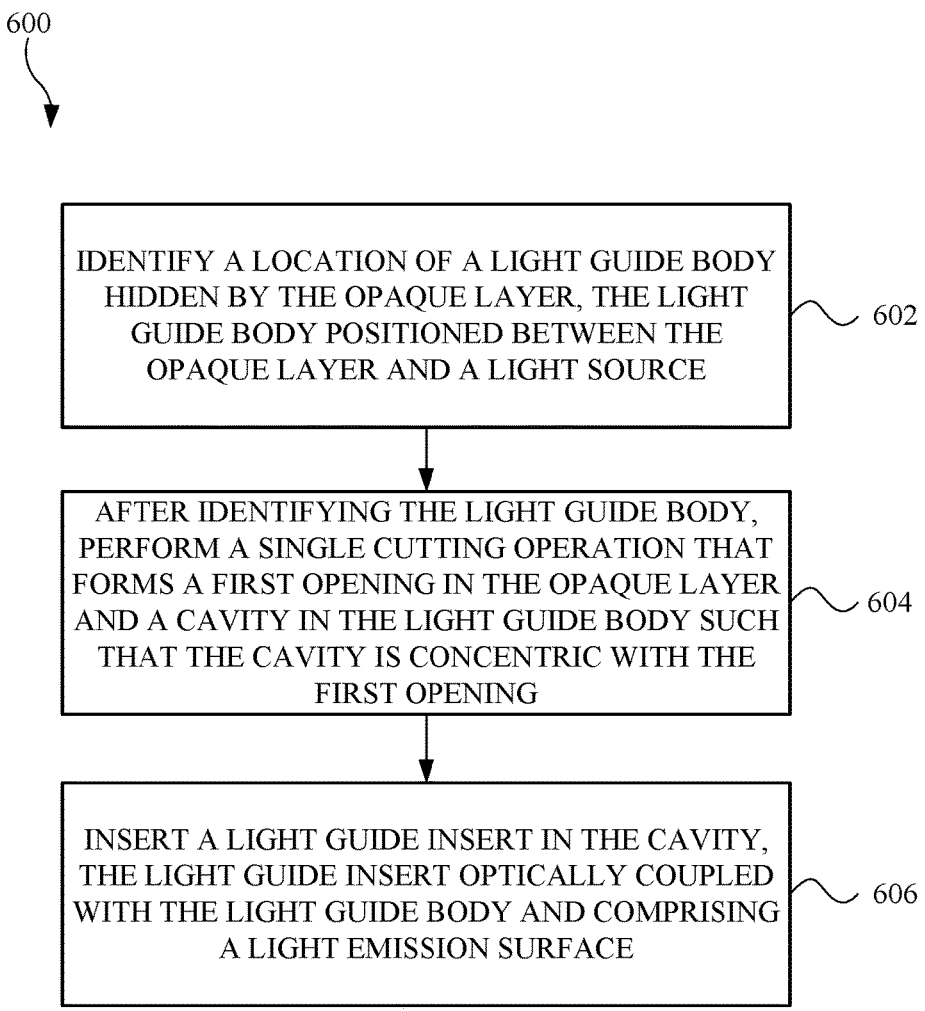
FIG. 20 illustrates a flowchart showing a method for assembling a light guide assembly for an accessory device having an opaque layer, in accordance with some described embodiments.

FIG. 20 illustrates a flowchart 600 showing a method for assembling a light guide assembly in an accessory device having an opaque layer, in accordance with some described embodiments. In step 602, a location of a light guide body is identified. The light guide body may be hidden by the opaque layer. The means for locating may include, as non-limiting examples, determining a location of the light guide body based upon a predetermined tolerance (of the positioning of the light guide body in the accessory device), using an X-ray or other vision system, or using a sensor (including a capacitive sensor) to determine a position of the light guide body. Also, the light guide body may be positioned between the opaque layer and a light source.

In step 604, after the light guide body is identified, a single cutting operation is performed. The single cutting operation may form a first opening (or through hole) in the opaque layer and a cavity (or blind hole) in the light guide body such that the cavity is aligned and concentric with the first opening.

In step 606, a light guide insert is inserted in the cavity. The light guide insert may be optically coupled with the light guide body and may include a light emission surface. In some embodiments, the light guide insert is configured to receive the light from the light guide body and pass the light across the light emission surface. Also, the light guide insert may be adhesively secured with the light guide body by an optically clear adhesive.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for an electronic device, the accessory device comprising:
    an opaque layer that defines a receiving surface for the electronic device, the opaque layer comprising a through hole;
    a battery covered by the opaque layer, the battery capable of charging the electronic device;
    a connector that electrically couples to the electronic device to the battery;
    a light guide body covered by the opaque layer, the light guide body comprising a light receiving surface that receives the light, the light guide body comprising a cavity that partially extends into the light guide body, the cavity aligned with the through hole, the light guide body comprising i) a first portion curved to define a focal point and ii) a second portion, wherein light rays from a light source reflected from the second portion converge to the focal point; and
    a light guide insert carried by the light guide body within the cavity, the light guide insert arranged to pass the light rays from the light guide body through the through hole.

2. The accessory device of claim 1, wherein the light guide body comprises a first optically conductive material and wherein the light guide insert comprises a second optically conductive material different from the first optically conductive material.

3. The accessory device of claim 2, where the first optically conductive material comprises a first refractive index, and wherein the second optically conductive material comprises a second refractive index greater than the first refractive index.

4. The accessory device of claim 1, wherein the second portion includes the cavity for the light guide insert.

5. An accessory device suitable for carrying an electronic device, the accessory device comprising:
    a bottom wall comprising an opening, the bottom wall defining a receiving surface for the electronic device;
    sidewalls that extend from and surround the bottom wall, wherein the sidewalls and the bottom wall define a receptacle for the electronic device;
    a battery separated from the receptacle by the bottom wall;
    a first light source and a second light source, the first light source providing light to indicate a first charging state of the battery, the second light source providing light to indicate a second charging state of the battery, the second charging state different from the first charging state; and a light guide assembly positioned between the bottom wall and the first and second light sources, the light guide assembly comprising:

a light guide body having a light receiving surface that receives the light from at least one of the first light source and the second light source, the light guide body comprising a cavity aligned with the opening, and a light guide insert positioned in the cavity carried by the light guide body and aligned with the opening, the light guide insert comprising a light emission surface, wherein the light guide insert is configured to receive the light from the light guide body and diffuse the light across the light emission surface, thereby causing the light to pass through the opening and away from the bottom wall, wherein the light guide assembly is covered by the electronic device when the electronic device is positioned in the receptacle.

6. The accessory device of claim 5, further comprising a compartment that defines a housing for the first and second light sources, the light guide body, the light guide insert, and an internal power supply capable of charging the electronic device.

7. The accessory device of claim 5, wherein the light guide insert extends outward beyond the light guide body and into the opening, and wherein the light guide insert is sub-flush with respect to the bottom wall.

8. The accessory device of claim 5, wherein the light guide insert is cylindrical and wherein the cavity is concentric with respect to the opening.

9. The accessory device of claim 5, wherein the light received by the light guide body that passes to a location other than the light guide insert is absorbed by an interior surface of the bottom wall.

10. The accessory device of claim 9, wherein only the light received by the light guide body and that passes through the light guide insert is visible.

11. A method for assembling a light guide assembly in an accessory device having an opaque layer, the method comprising:

identifying a location of a light guide body hidden by the opaque layer, the light guide body positioned between the opaque layer and a light source, wherein sidewalls extend from the opaque layer and define a receptacle for an electronic device, wherein a connector extends from a sidewall of the sidewalls to electrically couple the electronic device to a battery carried by the accessory device, and wherein the light guide body comprises a first portion and a second portion different from the first portion;

after identifying the light guide body, performing a single cutting operation that forms a through hole in the opaque layer and a cavity in the light guide body such that the cavity is concentric with the through hole; and inserting a light guide insert in the cavity, the light guide insert optically coupled with the light guide body and comprising a light emission surface, wherein the light guide insert is configured to receive the light from the light guide body and pass the light across the light emission surface, wherein light rays from a light source in the accessory device are reflected from the second portion converge at the first portion.

12. The method of claim 11, further comprising positioning the light guide body in a compartment of the accessory device, the compartment providing a housing for light source and an internal power supply.

13. The method of claim 12, further comprising positioning the light guide body between the opaque layer and a second light source, wherein the light source provides a first indication corresponding to a first charging state of the internal power supply, and wherein the second light source provides a second indication different from the first indication corresponding to a second charging state of the internal power supply different from the first charging state.

14. The method of claim 11, further comprising adhesively securing the light guide insert with the light guide body with optically clear adhesive.

15. The method of claim 11, further comprising:

positioning a first portion of the light guide body to receive the light from the light source, the first portion having a curved region that forms a focal point; and positioning a second portion of the light guide body such that the second portion receives the light at the focal point and transmits the light to the light guide insert, wherein the second portion is offset with respect to the first portion.

16. The accessory device of claim 5, further comprising a connector that extends from a sidewall of the sidewalls, the connector capable of electrically coupling the electronic device to the battery, wherein when the electronic device is electrically coupled to the connector, the first light source and the second light source are covered by the electronic device.

17. The accessory device of claim 5, wherein the light comprises light rays that reflect from a first portion of the light guide body and to a focal point prior to passing through the light guide insert.

18. The accessory device of claim 1, further comprising sidewalls extending away from the opaque layer, the sidewalls defining a receptacle that receives the electronic device.

19. The accessory device of claim 18, further comprising a compartment that carries the battery, the light guide body, the light guide insert, and the light source, wherein the receptacle is separated from the compartment by the opaque layer.

20. The accessory device of claim 1, wherein light emitted by the light source is not visible when the electronic device engages the receiving surface.

* * * * *